United States Patent [19]
Furuta et al.

[11] Patent Number: 5,225,667
[45] Date of Patent: Jul. 6, 1993

[54] IC CARD

[75] Inventors: Shigeru Furuta; Etsushi Takebayashi, both of Itami, Japan

[73] Assignee: Mitsubishi Denki Kabushiki Kaisha, Tokyo, Japan

[21] Appl. No.: 813,506

[22] Filed: Dec. 26, 1991

[30] Foreign Application Priority Data

Dec. 28, 1990 [JP] Japan ................................. 2-408751
Dec. 12, 1991 [JP] Japan ................................. 3-329095

[51] Int. Cl.$^5$ ............................................. G06K 19/06
[52] U.S. Cl. ..................................... 235/492; 235/380; 235/382
[58] Field of Search ........................ 235/380, 382, 492

[56] References Cited
U.S. PATENT DOCUMENTS 5,157,247 10/1992 Takahira ............................. 235/382

Primary Examiner—Harold Pitts
Attorney, Agent, or Firm—Leydig, Voit & Mayer

[57] ABSTRACT

An IC card prevents an internal battery from being rapidly consumed and internal data from being lost due to frequent use or erroneous starts caused by external noise. The number of starts of the card and the number of erroneous starts thereof are respectively counted by registers in a RAM. When one of these start numbers reaches a set value, the receiving circuit selected is switched to another receiving circuit having a higher threshold value and requiring no bias current, or the threshold value of the receiving circuit is increased by an inhibit circuit so that the internal power consumption of the card is suppressed, and the card is not affected by external noise. In addition, when the value of one of the registers reaches a set value, the external device informs the user of the fact that the value has reached a set value, using sound or a visual display.

12 Claims, 11 Drawing Sheets

IC CARD

BACKGROUND OF THE INVENTION

1. Field of the Invention

The present invention relates to a non-contact type IC card which contains a power source for data communication with an external device such as a terminal device or the like using electromagnetic waves.

2. Description of the Related Art

Figure 12:
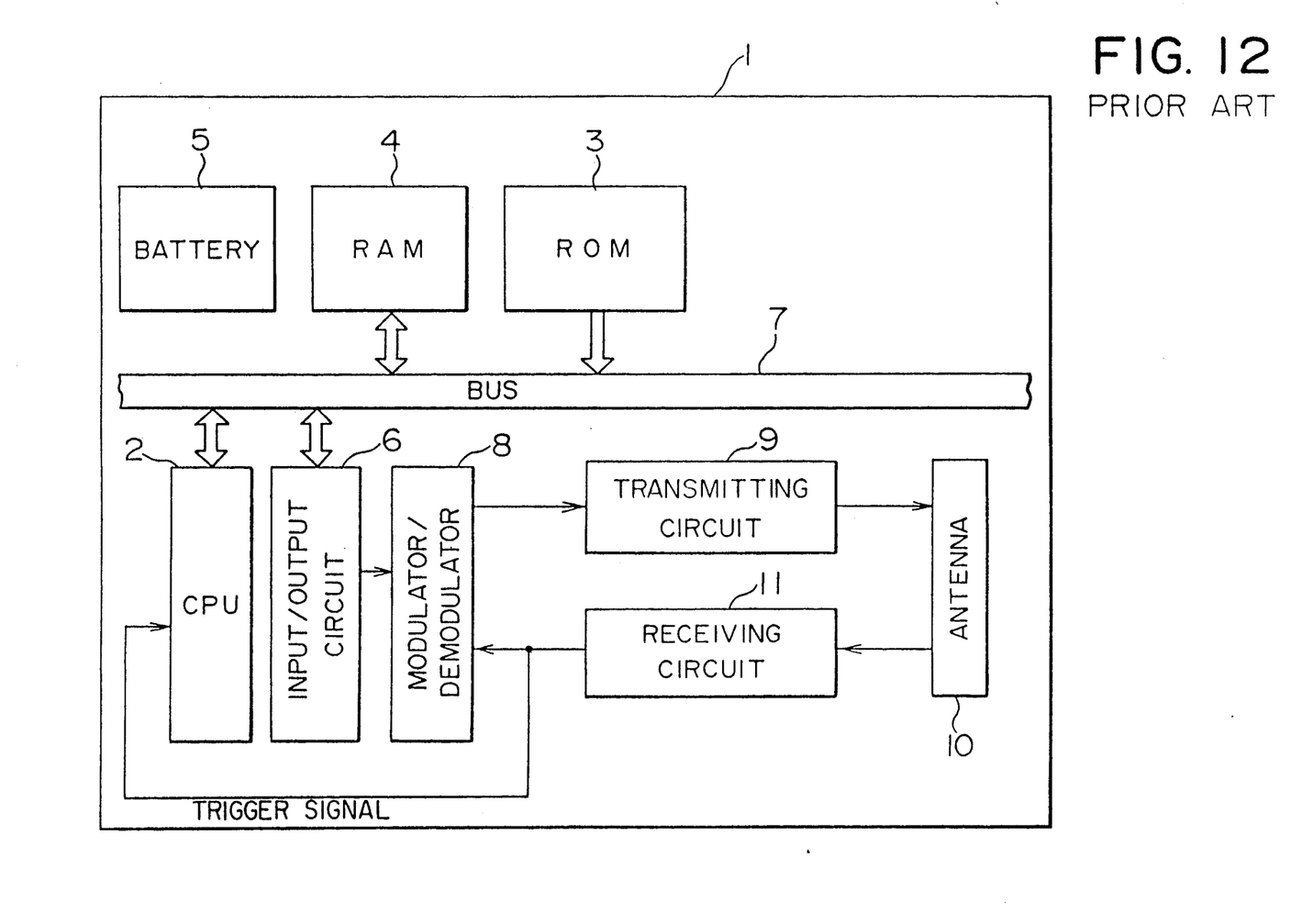
FIG. 12 is a block diagram showing the arrangement of a conventional IC card.

FIG. 12 is a block diagram showing a conventional non-contact type IC card. In the drawing, reference numeral 1 denotes the body of an IC card. The IC card body 1 comprises a CPU 2 for controlling signals and processing data in the card, a ROM 3 for storing a program therein, a RAM 4 serving as a data memory, a battery 5, an input/output circuit 6 for parallel-serial conversion/serial-parallel conversion, and an antenna 10.

The CPU 2, the ROM 3, the RAM 4 and the input/output circuit 6 are connected to each other through a bus 7 so that data can be transmitted to and received from each other. A modulator/demodulator 8 is interposed between the transmitting circuit 9 and a receiving circuit 11 are interposed between the modulator/demodulator 8 and the antenna 10. The data output from the input/output circuit 6 is modulated by the modulator/demodulator 8, passed through the transmitting circuit 9 and then output as an electromagnetic wave from the antenna 10. The data received by the antenna 10 is amplified by the receiving circuit 11. A trigger signal is input directly to the CPU 2, and the data signal is modulated and converted into a logic level by the modulator/demodulator 8, passed through the input/output circuit 6 and the bus 7 and input to the CPU 2 in which the signal is processed. The battery 5 serves as a power source for each of the circuits. The connection of the battery 5 is not shown in the drawing.

The operation of the conventional IC card is described below. Although electricity is usually constantly supplied to the receiving circuit 11 and so on from the battery 5, when the IC card does not communicate with an external device such as a card reader or the like, an oscillation circuit in the CPU 2 is stopped so that the IC card assumes a stand-by state. When a trigger electromagnetic wave for activating the CPU 2 is output from the external device and is received by the antenna 10, an analog signal corresponding to the electromagnetic wave received is output to the receiving circuit 11 from the antenna 10. If the voltage of the signal exceeds the threshold voltage of the receiving circuit 11, the receiving circuit 11 generates a trigger signal at the logic level and inputs it to the CPU 2. When the trigger signal is input to the CPU 2, the oscillation circuit in the CPU 2 is operated, and the data signal is converted into a digital signal by the receiving circuit 11, demodulated by the modulator/demodulator 8 and then input to the input/output circuit 6. The data input to the input/output circuit 6 is read by the CPU through the bus 7. An operation clock signal supplied to each of the circuits, and the data signal is processed according to the program stored in the ROM 3. During data processing, data is temporarily stored in the RAM 4. The receiving circuit 11 comprises a differential amplifier circuit or the like and has a threshold voltage of several hundreds of mV.

On the other hand, during or after data processing, transmit data to be transmitted to the external device is input to the input/output circuit 6 through the bus 7. The input/output circuit 6 inputs the data as a digital signal to the modulator/demodulator 8 which modulates the digital signal and inputs it to the transmitting circuit 9. The transmitting circuit 9 converts the digital signal to an analog signal and outputs the analog signal to the antenna 10 which outputs as an electromagnetic wave the signal to the external device.

Figure 13A:
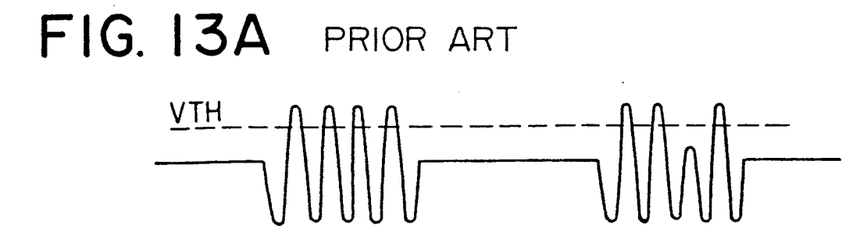
FIGS. 13A, 13B and 13C show waveforms for explaining the operation of the IC card shown in FIG. 12.
Figure 13B:
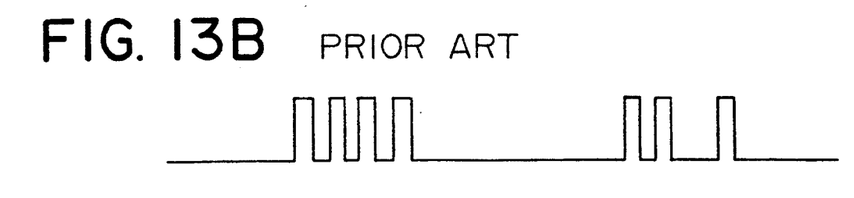
Figure 13C:
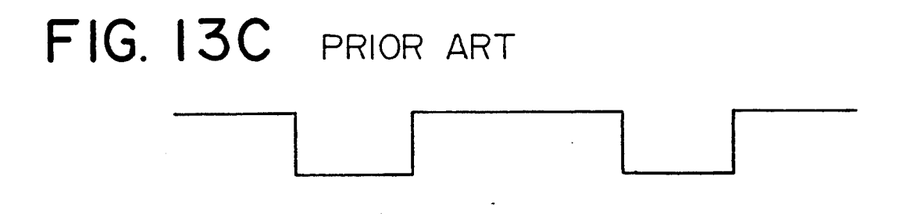

FIG. 13 shows the output signal of each of the antenna 10, the receiving circuit 11 and the modulator/demodulator 8. The antenna 10 inputs the analog signal shown in FIG. 13A to the receiving circuit 11. In the receiving circuit 11, for example, a threshold value $V_{TH}$ is set so that the analog signal is converted into the digital signal shown in FIG. 13B on the basis of the threshold value. The digital signal is sent from the receiving circuit 11 to the modulator/demodulator 8, demodulated to the digital signal shown in FIG. 13C by the modulator/demodulator 8 and then sent to the input/output circuit 6. When a single pulse is missing in a pulse group, as shown on the right side of the drawing, pulses are generated so as to make up the pulse missing. Conversely, when the IC card sends a signal from the antenna 10, the digital signal shown in FIG. 13C which is sent from the input/output circuit 6 is modulated to become the signal shown in FIG. 13B by the modulator/demodulator 8 and converted into the analog signal shown in FIG. 13A by the transmitting circuit 9. The analog signal is supplied to the antenna 10 and then sent to the external device.

When communication with the external device is completed, the oscillation circuit of the CPU 2 is again stopped so as to bring the IC card into a stand-by state, thereby suppressing power consumption. However, in the stand-by state, a bias current is constantly passed through the receiving circuit 11 for receiving the trigger electromagnetic wave.

The power consumption of such a type of IC card includes a constantly flowing bias current and a large current of several mA which is consumed for starting the operation of the CPU 2 then the intensity of the electromagnetic wave received by the antenna 10 exceeds the threshold voltage of the receiving circuit 11.

However, such a voltage above the threshold voltage is generated not only by the trigger electromagnetic wave output from a predetermined external device but by the noise generated by other electronic devices which sometimes activates the IC card in the same way as that described above. In an environment generating much noise, the battery is therefore consumed before the end of the guarantee period due to the frequent activation of the CPU 2. This battery failure makes data loss or the like.

In addition, the battery 5 has a small capacity because the IC card body 1 has a thin plate-like form, and the battery 5 cannot be replaced by a new battery because the battery 5 is sealed by the outer package provided on the IC card body 1. The conventional IC card has the above-described problems.

SUMMARY OF THE INVENTION

The present invention has been achieved in consideration of the above circumferences, and it is an object of the invention to provide an IC card which prevents a battery from being consumed before the end of the guarantee period due to the operational errors produced by external noise or the like so as to prevent internal data loss or the like.

Considering the above object, the present invention provides an IC card which contains a battery, which transmits and receives data and signals to and from an external device by using electromagnetic waves, and which starts a data processing means from a stand-by state in response to a trigger signal output from an external device, the IC card comprising nonvolatile storage means for storing a program; volatile storage means for storing data; start number counting/storing means for counting and storing at least the total number of starts of the data processing means, wherein the data processing means controls signals in the card and processing of data therein according to the program and generates a control signal when the count value of the start number counting/storing means reaches a set value, the processing means being started by a trigger signal from outside of the card; a bus connecting the processing means, the nonvolatile storage means, the volatile storage means and the start number counting/storing means to each other; an antenna for converting the electrical analog transmit signal into an electromagnetic wave, sending the transmit signal outside of the card, and converting the electromagnetic waves received from the outside of the card into an electric analog receive signal; input/output controlling means connected between the antenna and the bus for increasing the lower threshold of a receivable signal level in response to the control signal supplied from the data processing means when the count value of the start number counting/storing means reaches the set value; and a battery serving as a power source.

In the present invention, when the number of starts reaches the set value, the threshold value of the input/output controlling means is increased, and the flow of a bias current is made unnecessary.

In the present invention, the start number counting/storing means counts and stores the number of starts and the number of continuous erroneous starts so that the threshold value of the input/output controlling means is increased when one of the numbers reaches a set value.

In the present invention, the data processing means sends a code showing when the number of starts reaches the set value, and the external device is provided with means for informing the user of the number of starts fact when the code is received.

In the present invention, the external devices periodically generate a dump command, the IC card reads all data stored in the volatile storing means and outputs the data to the external device in response to the dump command when the number of starts reaches a set value, and the code showing that the number of starts reached the set value is then sent to the external device.

In addition, a second control signal is generated for returning the lower threshold value of the receivable signal level of the input/output controlling means to a normal value each time the data processing means is started by the trigger signal.

In the present invention, when the number of starts of the data processing means reaches the set value, the threshold value of the input/output controlling means is increased so that the card is not started unless a trigger signal of a higher level is supplied, thereby preventing the card from being affected by noise.

In addition, when the number of stars reaches the set value, the bias current flowing through the input/output controlling means is stopped so that the power consumption in the card is stopped.

In the present invention, the number of continuous erroneous starts is also counted and stored, and the threshold value of the input/output controlling means is increased when the number of erroneous starts caused by external noise or the like reaches the set value so that the card is not started by noise unless a trigger signal at a higher level is supplied thereto.

In the present invention, a code showing that the number of starts reaches the set value is sent to the external device which informs the user by a display or sound.

In the present invention, when the number of starts reaches the set value, before the threshold value of the receivable signal of the input/output controlling means is increased, all data stored is read and sent to the external device in response to the dump command output from the external device by control of the data processing means, thereby preventing the data in the IC card from completely disappearing.

In the present invention, since the data processing means generates the second control signal for returning the threshold value of the receive signal of the input/output controlling means to a normal value each time the data processing means is started, even if the threshold value of the input/output controlling means is increased, the threshold value can be returned to a normal value by supplying a trigger signal at a higher level, for example, using a dedicated device, whereby the card can be used over again.

BRIEF DESCRIPTION OF THE DRAWINGS

FIG .6 is a block diagram showing the arrangement of an external device used together with an IC card of the invention.

DETAILED DESCRIPTION OF PREFERRED EMBODIMENTS

Embodiments of the present invention are described below with reference to the accompanying drawings.

Figure 1:
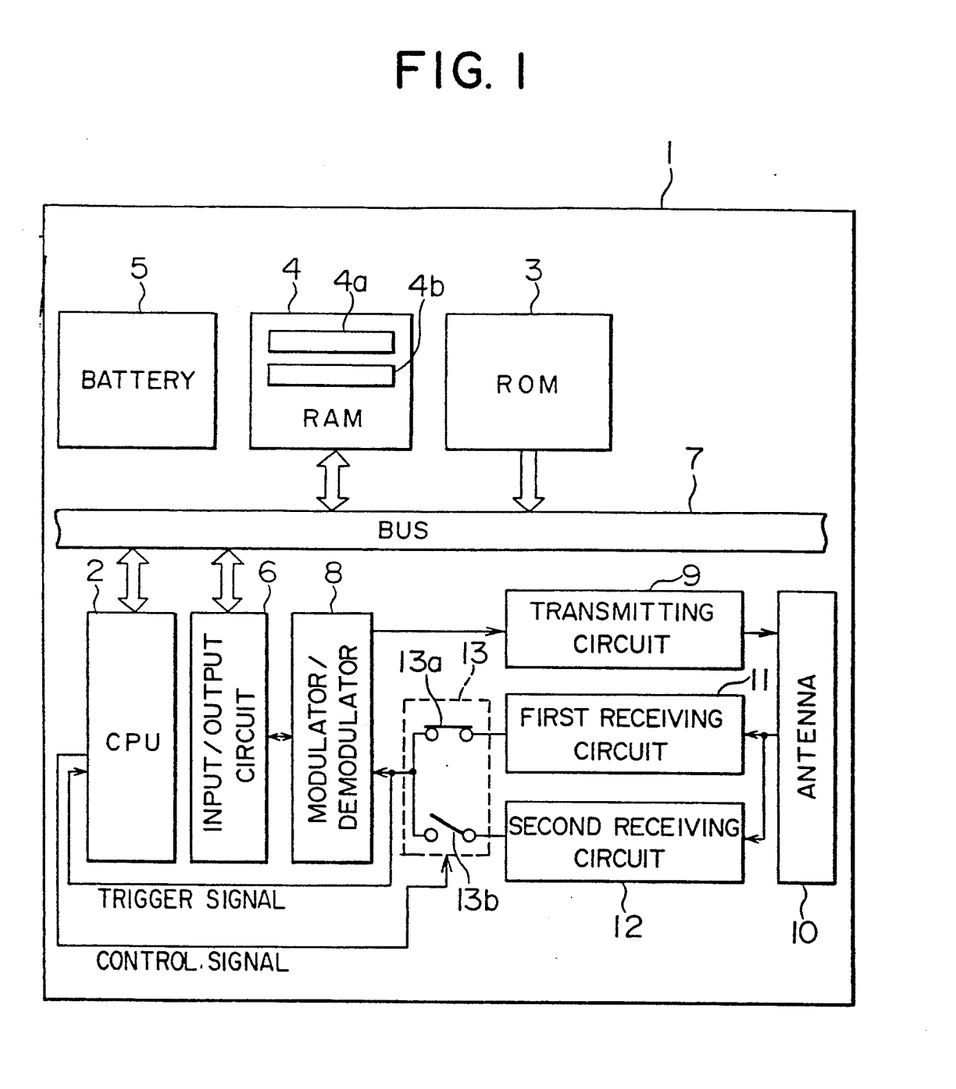
FIG. 1 is a block diagram showing the arrangement of an IC card in accordance with a first embodiment of the present invention.

FIG. 1 is a block diagram showing an IC card in accordance with a first embodiment of the present invention. In the drawing, reference numeral 1 denotes a card body. The card body 1 contains a CPU 2 serving as data processing means for controlling the whole card, a ROM 3 serving as nonvolatile storage means for storing a program, a RAM 4 serving as volatile storage means for storing data, a battery 5 serving as a power source, and an input/output circuit 6 for parallel-serial conversion/serial-parallel conversion and an antenna 10.

The CPU 2, the ROM 3, the RAM 4 and the input/output circuit 6 are connected to each other through a bus 7 for transmitting and receiving data to and from each other. The arrangement of the IC card is substantially the same as that of the conventional IC card shown in FIG. 12. However, the IC card according to the present invention comprises a start number register 4a for counting and storing the total number of starts of the CPU 2, and an erroneous start number register 4b for counting and storing the number of continuous erroneous starts, both of which are provided in the RAM 4. The IC card further comprises a modulator/demodulator 8 interposed between the input/output circuit 6 and the antenna 10, and a transmitting circuit 9, a first receiving circuit 11, a second receiving circuit 12 and a switch 13, which are interposed between the modulator/demodulator 8 and the antenna 10. The transmitting circuit 9 is the same as that provided in the conventional IC card. Although the first and second receiving circuits 11 and 12 will be described below, the second receiving circuit 12 has a higher threshold value than that of the first receiving circuit 11. The switch 13 comprises an electronic switch such as a transistor or the like and is switched in response to the switching signal output from the CPU 2. The input/output circuit 6, the modulator/demodulator 8, the transmitting circuit 9, the first receiving circuit 11, the second receiving circuit 12 and the 13 are part of an input/output controlling means.

The data signal converted to data by the input/output circuit 6 is modulated by the modulator/demodulator 8, converted into an analog signal by the, transmitting circuit 9 and then output as an electromagnetic wave to an external device from the antenna 10. On the other hand, when an electromagnetic wave is received by the antenna, 10, an analog signal corresponding to the electromagnetic wave received by the antenna 10 is converted into a digital signal by one of the first and second receiving circuits 11 and 12, demodulated by the modulator/demodulator 8, input to the input/output circuit 6 where the signal is converted into a parallel digital signal, and then input to the CPU 2.

Figure 2A:
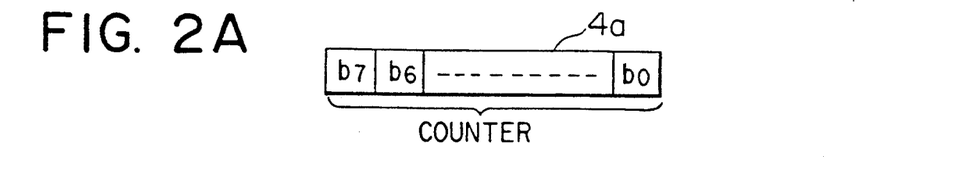
FIGS. 2A and 2B are drawings of bit arrangements in the register in the RAM shown in FIG. 1.
Figure 2B:
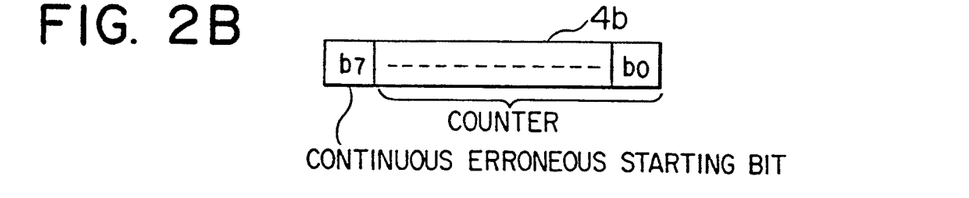

FIGS. 2A and 2B are conceptual drawings showing the bit arrangements in the start number register 4a and the erroneous start number register 4b, respectively, in the RAM 4. The start number register 4a comprises, for example, a 8-bit register in which bits 0 to 7 are used as a counter. Each time a received card is started by the trigger signal, the count value is read, and incremented by 1 and then written so that the number of starts of CPU 2 including the number of erroneous starts thereof is counted and stored.

The erroneous start number register 4b similarly comprises a 8-bit register in which bits 0 to 6 are used as a counter, and bit 7 is used for showing continuous operation errors. When an erroneous start occurs, bit 7 is set to "1" and, when the CPU 2 is normally started, it is cleared to "0", and the count value of the register 4b is also cleared to zero. The bit 7 which is presently set to "1" shows the preceding erroneous start. When an erroneous start presently occurs, the count value of the erroneous start number register 4b is read, incremented by 1 and then written, whereby the number of continuous erroneous starts of the CPU 2 are counted and stored.

Figure 3:
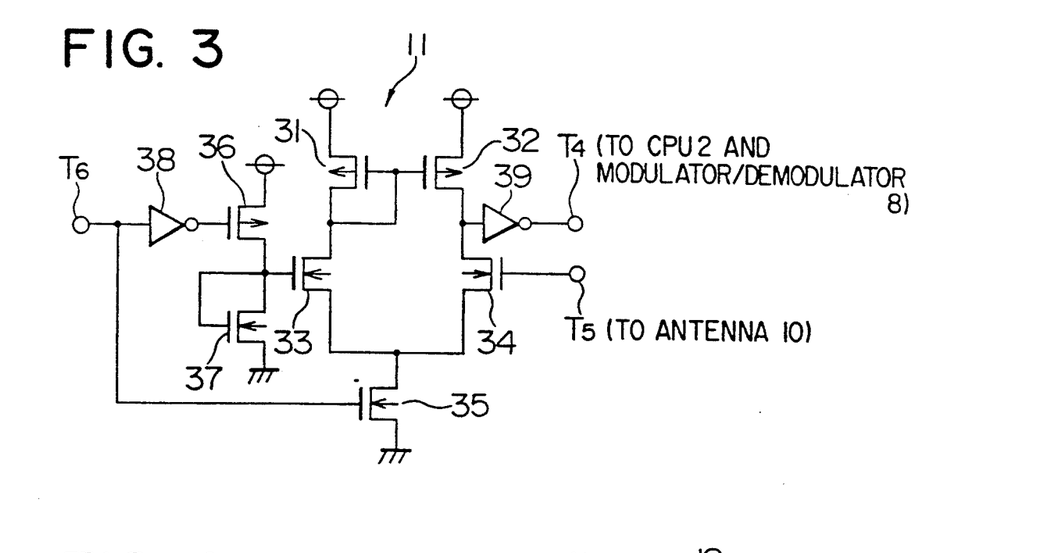
FIG. 3 is a schematic drawing showing the first receiving circuit shown in FIG. 1.

FIG. 3 is a schematic diagram showing an example of the first receiving circuit 11. In the circuit and two p-channel MOS transistors 31, 32 of the same size form a current mirror, n-channel MOS transistors 33 and 34 of the same size form a differential portion, and an n-channel transistor 35 forms a constant-current source. The output terminal of a reference voltage generating circuit comprising a p-channel MOS transistor 36 and an n-channel MOS transistor 37 is connected to the gate of the n-channel MOS transistor 33 to form a differential amplifier. Reference numerals 38 and 39 respectively denote CMOS inverters.

When the receiving circuit 11 is selected by the CPU 2, the contacts 13a of the switch 13 are closed, and a signal "H" of high level is supplied to terminal $T_6$. At this time, the n-channel MOS transistor 35 is turned on, and a predetermined bias current flows through a circuit comprising the transistors 31 to 35. On the other hand, when a reversed signal "L" of low level is supplied to the gate of the p-channel MOS transistor 36 from the CMOS inverter 38, the p-channel MOS transistor 36 and the n-channel MOS transistor 37 are turned on, and a reference voltage (threshold voltage) is supplied to the gate of the n-channel MOS transistor 33 of the differential portion.

A terminal $T_5$ is connected to the antenna 10 so that when an electromagnetic wave is received by the antenna 10, the output of the antenna 10 is supplied to the gate of the n-channel transistor 34 which constitutes the differential portion. The differential portion thus compares the reference voltage supplied to the gate of the n-channel transistor 33 with the output of the antenna 10 supplied to the gate of the n-channel transistor 34. If the output from the antenna 10 is higher than the reference voltage, a signal "H" of high level is output to a terminal $T_4$ through the CMOS inverter 39. If the output is lower than the reference voltage, a signal "L" of low level is output to the terminal $T_4$. Since the reference voltage is generally as low as several hundred mV, the receiving circuit 11 can convert the small voltage received by the antenna 10 into a logic level signal.

On the other hand, when the receiving circuit 11 is not selected, the contacts 13b are closed, and the 13a are opened. At this time, the n-channel MOS transistor 35 is turned off, and the bias current is cut off. Further, a reversed signal "H" of high level is supplied to the gate of the p-channel MOS transistor 36 from the CMOS inverter 38, and both the p-channel MOS transistor 36 and the n-channel MOS transistor 37 are turned off. A signal "L" of low level is output from the terminal $T_4$.

Figure 4:
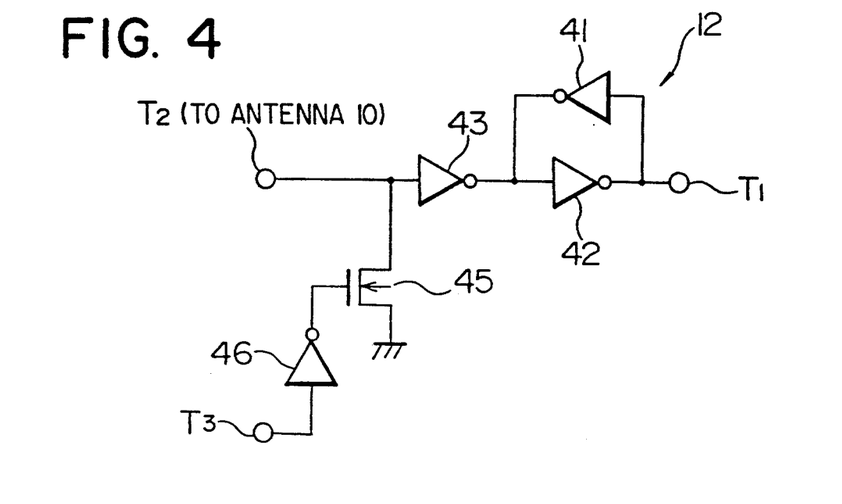
FIG. 4 is a schematic drawing showing the second receiving circuit shown in FIG. 1.

FIG. 4 is a schematic diagram showing an example of the second receiving circuit 12 having a threshold value higher than that of the first receiving circuit 11. The receiving circuit 12 is provided with CMOS trigger inverters 41, 42, and 43 as 43 a Schmitt trigger circuit, an n-channel MOS transistor 45 which constitutes a circuit for fixing the input at "L" for the Schmitt trigger circuit when the circuit 12 is not selected, and a CMOS inverter 46 connected to the gate of the n-channel MOS transistor 45.

When the receiving circuit 12 is not selected, a signal "L" of low level is supplied to a terminal $T_3$ from the CPU 2 and is inverted by the CMOS inverter 46 to generate a signal "H" of high level. The signal "H" is supplied to the gate of the n-channel MOS transistor 45 so as to turn the MOS transistor 45 on, and the input to the Schmitt trigger circuit is made "L" level. This causes the the signal "L" of low level to be output to the output terminal $T_1$ regardless of the signal input to the terminal $T_2$ from the antenna 10.

On the other hand, when the receiving circuit 12 is selected, a signal "H" of high level is supplied to the terminal $T_3$ from the CPU 2 and is inverted by the CMOS inverter 46 to generate a signal "L" of low level. The signal "L" is supplied to the gate of the n-channel MOS transistor 45 so as to turn the transistor 45 off. The signal input from the terminal $T_2$ connected to the antenna 10 is thus input to the Schmitt trigger circuit, and a signal corresponding to the input signal is output to the terminal $T_1$. The threshold value of the receiving circuit 12 is the CMOS level and is significantly higher than that of the receiving circuit 11. In addition, since the receiving circuit 12 comprises the CMOS inverters 41, 42, 43, and 46, no bias current is required, and the battery 5 is not consumed unless a trigger signal higher than the threshold value of the receiving circuit 12 is input.

Figure 5:
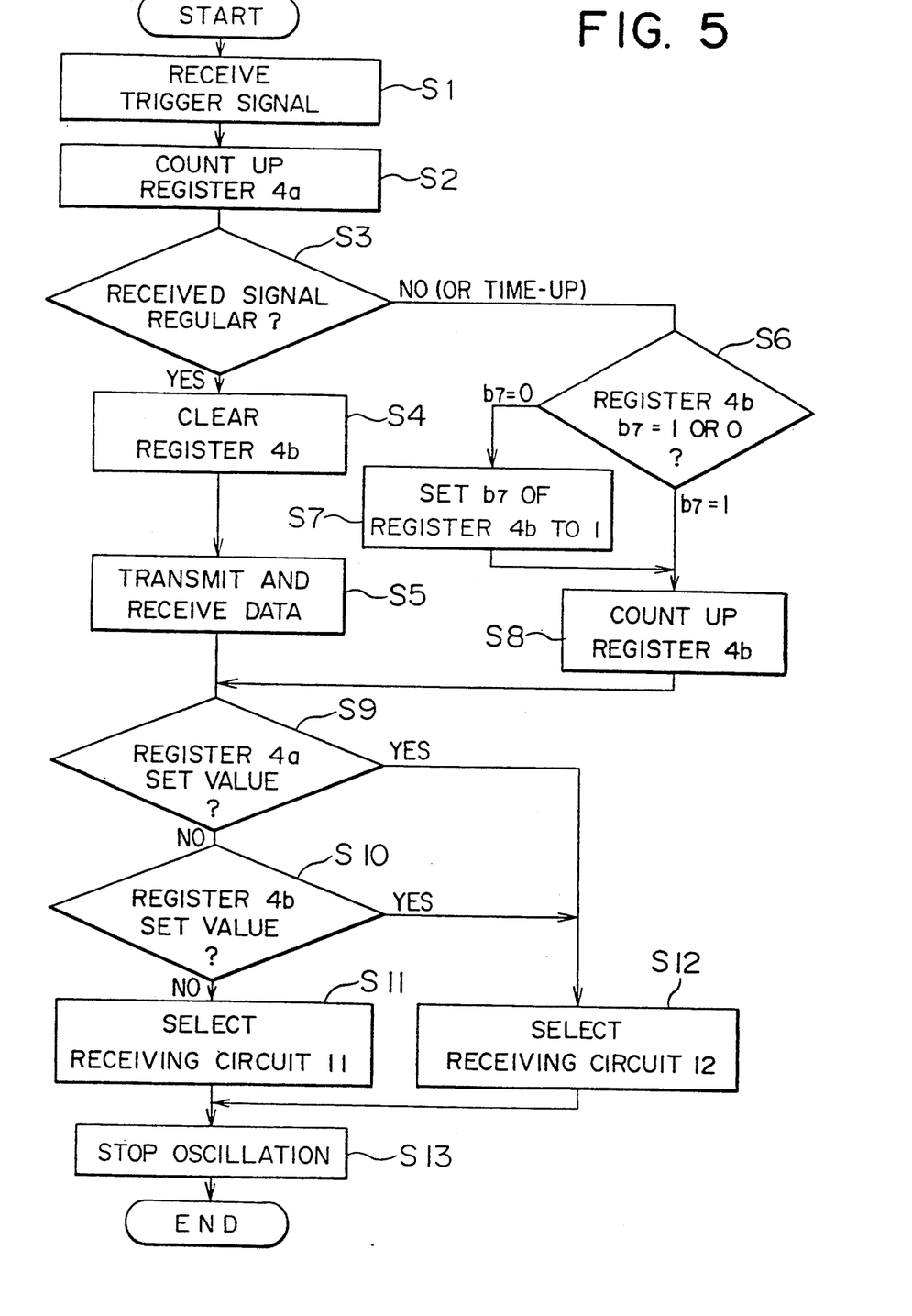
FIG. 5 is a flow chart showing the operation of the IC card in accordance with the first embodiment of the invention.

FIG. 5 is a flow chart showing the operating sequence of an IC card in accordance with a first embodiment of the present invention. The IC card is operated according to the program (not shown) stored, for example, in the ROM. The operation is described below with reference to the drawing. In the state where the IC card is normally used, the CPU 2 and the oscillation circuit (not shown), contained therein are stopped. The contacts 13a of the 13 shown in FIG. 1 are closed by the operation of the CPU 2, and the receiving circuit 11 is selected. In addition, the bias current flows through the receiving circuit 11 in order to receive a weak trigger electromagnetic wave. In this stand-by state, since the circuit of the IC card comprises a CMOS logic circuit, the consumed current includes only the bias current flowing through the receiving circuit 11.

When the trigger electromagnetic wave is sent from an external device and is received by the antenna 10 shown in FIG. 1, the trigger signal is supplied to the CPU 2 through the receiving circuit 12 and the switch 13, and the oscillation circuit in the CPU 2 is operated so as to start the CPU 2 (Step S1). When the operation of the CPU 2 is started, the value of the start number register 4a in the RAM 4, is incremented regardless of whether the CPU 2 is normally or erroneously started (Step S2). In this state, the IC card waits for identification information supplied from the external device. For example, when a receive signal such as an identification code or the like is sent from the external device, a decision is made by collation as to whether the identification code is regular. When the identification code or the like is not received within a predetermined time, a decision is made as to whether or not it is time out (Step S3). If it is decided that the received signal is regular, the count value of the erroneous start number register 4b is cleared (Step S4), and data is sent to and received from the external device (Step S5).

On the other hand, if it is decided in Step S3 that the received data is incorrect, or if regular data is not received within a predetermined time, a decision is made as to whether the value $b_7$ of the erroneous start number register 4b, which is shown in FIG. 2, is "1" or "0" (Step S6). If the value $b_7$ of bit 7 is "0", it is set to "1", and an operation error is indicated (Step S7). The count value of the erroneous start number register 4b is then incremented (Step S8). If it is decided in Step S6 that the bit value $b_7$ of the erroneous start number register 4b is "1", since erroneous starts are occurring at this time and did occur in the preceding time, i.e., continuous erroneous starts occur, the count value of the erroneous start number register 4b is immediately incremented (Step S8).

In the case of a normal start, after communication with the external device is completed, a decision is made as to whether the count value of the start number register 4a has reached the set value (Step S9). In the case of an erroneous start, after the erroneous start number register 4b is renewed, the above decision is made. If the count value has not reached the set value, a decision is made as to whether the count value of the erroneous start number register 4b has reached a set value (Step S10). If the count value has not reached the set value, the first receiving circuit 11 is selected (Step S11), and the CPU2 and the oscillation circuit therein are then stopped to return the IC card to the stand-by state (Step S13).

On the other hand, if it is decided in Steps 9, 10 that the count value of one of the start number register 4a and the erroneous start number register 4b has reached the set value, the CPU 2 supplies a control signal to the switch 13 so as to select the second receiving circuit 12 (Step S12), and the CPU 2 and the oscillation circuit therein are then stopped and return the IC card to the stand-by state (Step S13)

When the second receiving circuit 12 is selected, the threshold value becomes the CMOS level. Hence the IC card is not started by the usual trigger electromagnetic wave output from the external device, and it is necessary, for driving the IC card, to use an external device sending a high level transmit signal or to send a trigger electromagnetic wave from the external device which is brought close to the antenna of the IC card. This informs the user of the fact that the consumption of the battery 5 of the IC card proceeds. Even in the state where the user does not use the IC card, an erroneous start of the CPU 2, i.e., the IC card, is suppressed by the second receiving circuit 12, and there is no consumption of the battery because no bias current is required. In this state, the CPU 2 is started by the card issuer using another external device having a high transmit signal level so that the contents can be read. If the start number register 4a overflows, a new IC card is issued, and if the erroneous start number register 4b overflows, after the receiving circuit 12 is changed to the receiving circuit 11, the IC card is reissue to the user.

The CPU 2 supplies the control signal to the the switch 13 so as to select the second receiving circuit 12 when one of the total number of starts and the number of continuous erroneous starts reaches the set value. However, if a control signal (second control signal) is supplied to the switch 13 so as to select the first receiving circuit 11 each time the CPU 2 is started by the trigger signal output from the external device, the IC card having a high threshold value can be easily returned to the normal threshold value by supplying the trigger signal to the CPU 2 from an external device having a high transmit signal level.

Although the above-described embodiment concerns the case where the start number register 4a and the erroneous start number register 4b are provided in the RAM 4, an electrically rewritable memory or another logic counter may be provided. Although, in the embodiment, a bit showing continuous operation errors is set at bit 7 in the erroneous start number register 4b, the bit may be provided in another register. In addition, although the embodiment concerns the data transmission to and reception from an external device using an electromagnetic wave, the embodiment can be of course applied to the case where data is transmitted and received by using light. These changes apply to the embodiments below.

Figure 6:
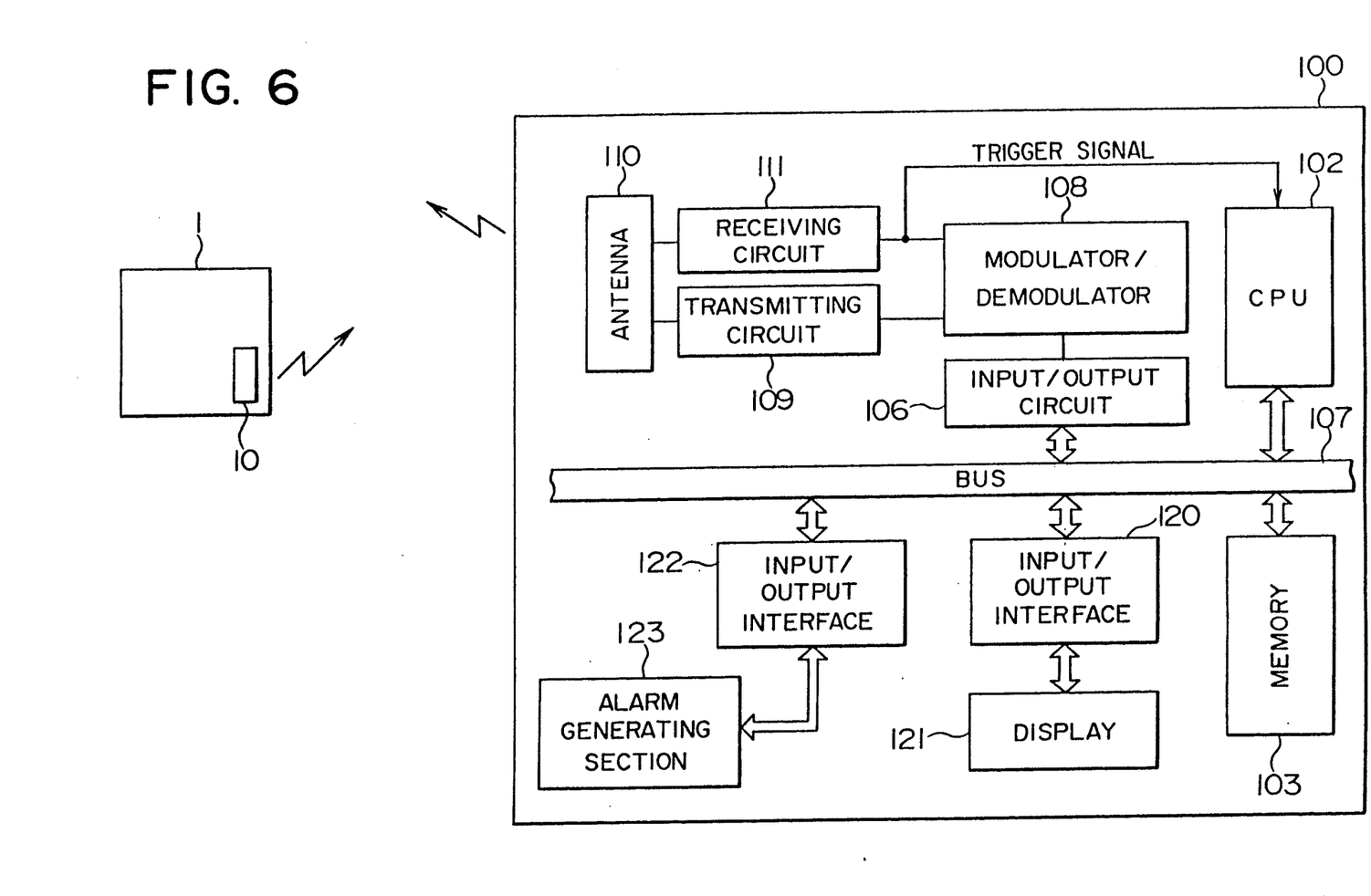

FIG. 6 is a block diagram schematically showing the structure of the external device used together with the IC card of the present invention. An external device 100 is generally a terminal device, a sensor or the like of a computer system and has substantially the same structure as that of the IC card. The external device 100 includes a CPU 102, a memory 103 having ROM and RAM, a bus 107, an antenna 110, a transmitting circuit 109, a receiving circuit 111, a modulator/demodulator 108 and an input/output circuit 106. Since the configuration of these circuits is the same as that of the IC card, it is not described below. The external device 100 used in the present invention further comprises a display 121 and an alarm generating section 123, both of which are particularly used in the embodiment described below. The display 121 and the alarm generating section 123 are connected to the bus 107 through input/output interfaces 120, 122, respectively. For example, the alarm generating section 123 generates sound.

Figure 7:
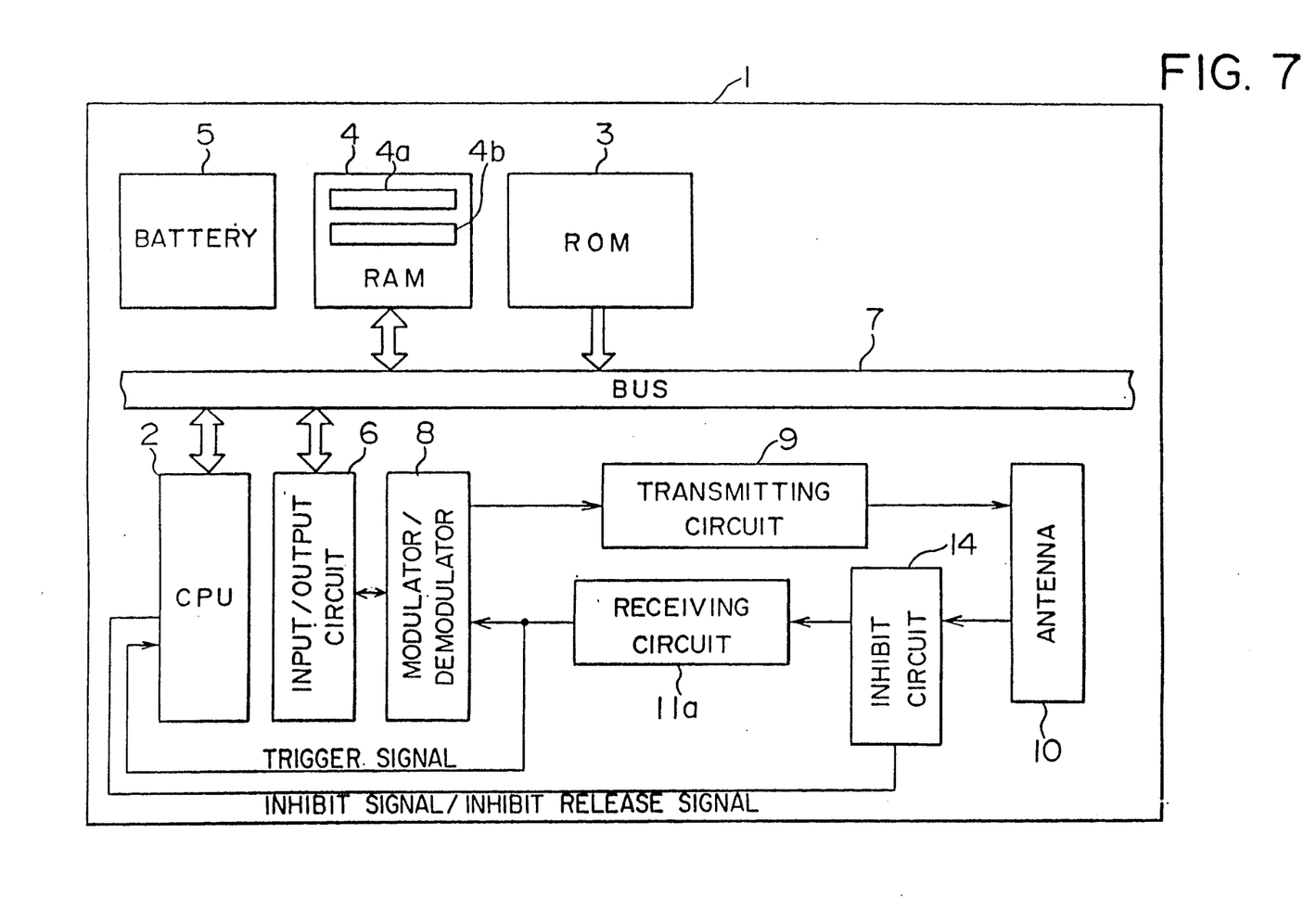
FIG. 7 is a block diagram showing the arrangement of an IC card in accordance with another embodiment of the invention.

FIG. 7 is a block diagram showing an IC card in accordance with a second embodiment of the present invention. The hardware of this IC card is different from the IC card shown in FIG. 1 in the point that a transmitting circuit 9, a receiving circuit 11a and an inhibit circuit 14 are interposed between a modulator/demodulator 8 and an antenna 10. The transmitting circuit 9 and the receiving circuit 11a are the same as conventional circuits. For example, the receiving circuit 11a may be the same as the receiving circuit shown in FIG. 3 in which a signal "H" of high level is constantly supplied to the terminal $T_6$. The inhibit circuit 14 is controlled by the CPU 2 so as to suppress the voltage received by the antenna 10. This is described below. In this embodiment, the input/output circuit 6, the modulator/demodulator 8, the transmitting circuit 9, the receiving circuit 11a and the inhibit circuit 14 constitute input/output controlling means. Either the start number register 4a for counting and storing the number of starts of the CPU 2 or the erroneous start number register 4b for counting and storing the number of continuous erroneous starts, both of which are provided in the RAM 4, may be provided. This applies to the first embodiment shown in FIGS. 1 to 5.

In the second embodiment, the data signal which is converted from a serial signal to a parallel signal by the input/output circuit 6 is modulated by the modulator/demodulator 8, converted into an analog signal from a digital signal by the transmitting circuit 9 and then output as an electromagnetic wave to the external device from the antenna 10. On the other hand, when an electromagnetic wave is received by the antenna 10, an analog signal corresponding to the received electromagnetic wave is sent to the inhibit circuit 14 and the receiving circuit 11a in which the signal is converted directly into a digital signal, and then demodulated by the modulator/demodulator 8. The digital signal is converted into a parallel digital signal by the input/output circuit 6 and then input to the CPU 2. Since the operations of the two registers 4a and 4b in the RAM 4 are the same as those described above with reference to FIG. 2, the operations are not described below.

Figure 8:
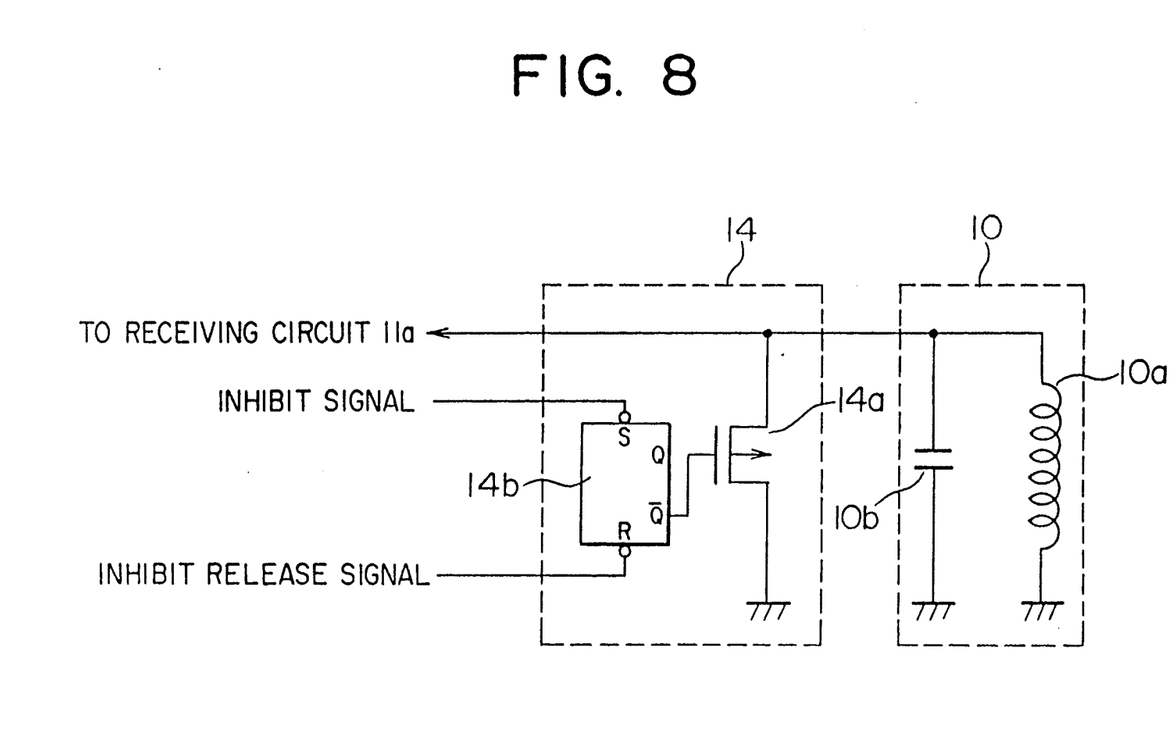
FIG. 8 is a schematic drawing showing the inhibit circuit shown in FIG. 7.

FIG. 8 shows an example of the circuit comprising the antenna 10 and the inhibit circuit 14. The antenna 10 comprises a resonance circuit formed by a coil 10a and a capacitor 10b. The inhibit circuit 14 comprises a p-channel MOS transistor 14a and a flip flop 14b for setting and resetting on the basis of the inhibit signal/inhibit release signal output from the CPU 2. When the inhibit signal which is a low level signal "L" is input to the set terminal S from the CPU 2, the flip flop 14b is set. This brings the output Q of the flip flop 14b into the level "L", and the transistor 14a is in a conducting (on) state so as to inhibit the receiving voltage of the antenna 10. On the other hand, when the inhibit release signal of the low level "L" is input to the reset terminal R from the CPU 2, the flip flop 14b is reset. This brings the output Q of the flip flop 14b into the "H" level, and the transistor 14a is in the non-conducting (off) state so as to release the inhibition of the voltage received by the antenna 10. When the CPU 2 is started, the CPU 2 invariably outputs the inhibit release signal.

It is also necessary to use the transistor 14a having a low threshold voltage (about 0.1 V) and set the resistance in the on state to a value which allows the receiving circuit 11a to receive the trigger signal only in the case where the IC card and the external device are extremely close to each other.

Figure 9:
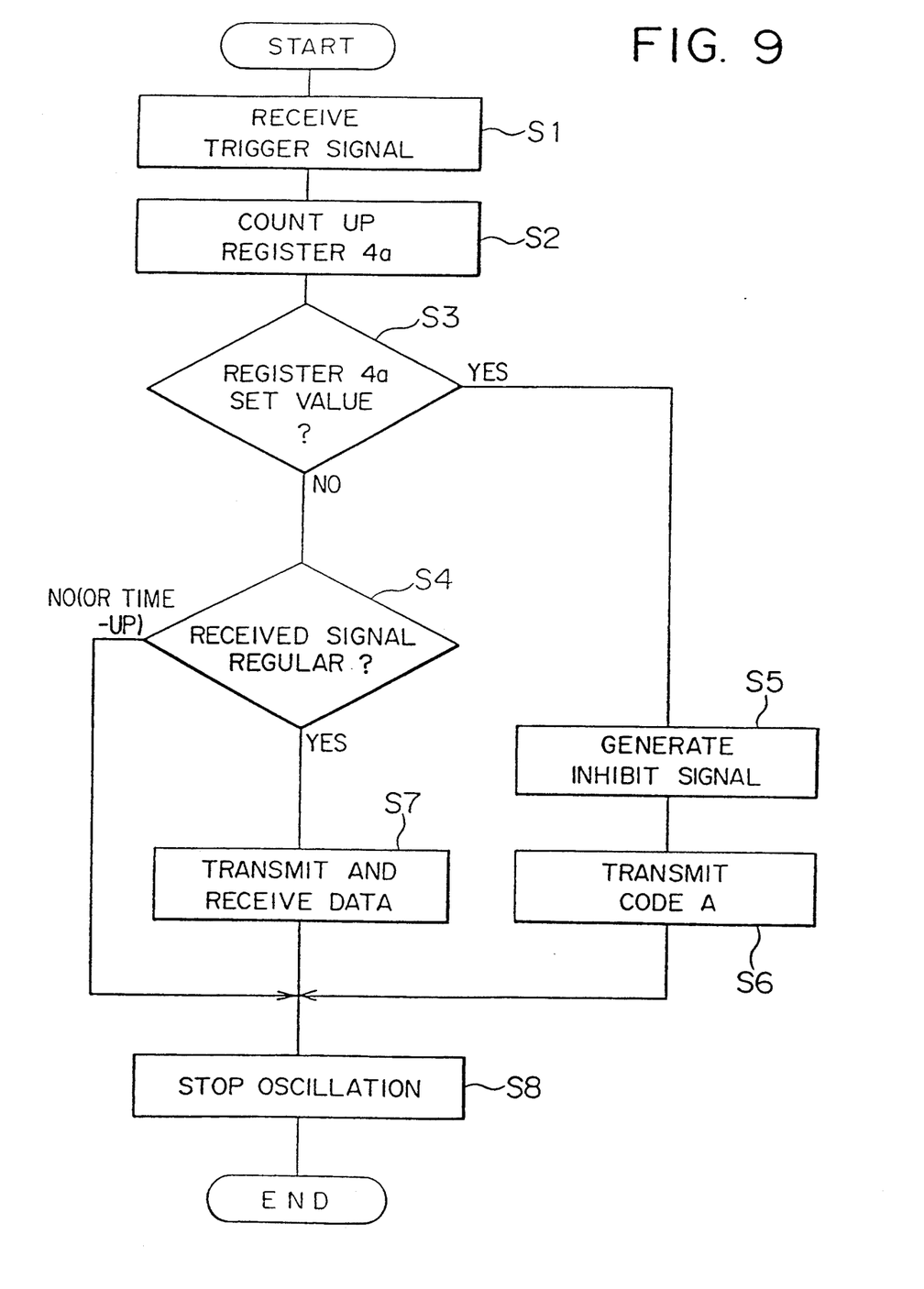
FIG. 9 is a flow chart showing the operation of an IC card in accordance with a second embodiment of the invention.

FIG. 9 is a flow chart showing the operation sequence of the IC card in accordance with the second embodiment of the present invention. The IC card is operated according to the program (not shown) which is stored, for example, in the ROM in the IC card. This embodiment does not use the erroneous start number register 4b. The operation of the second embodiment is described below with reference to FIGS. 2 and 6 to 9. When the IC card is used in the normal state, the CPU 2 and the oscillation circuit (not shown) contained therein are stopped. However, since a bias current flows receive the weak trigger electromagnetic wave. In this stand-by state, the current consumed by the IC card includes only the bias current flowing through the receiving circuit 11a.

When the trigger electromagnetic wave is sent from the external device and received by the antenna 10 shown in FIG. 7, the trigger signal is supplied to the CPU circuit in the CPU 2 is operated so as to start the CPU 2 (Step S1). When the CPU 2 is started, the count value of the start number register 4a, which is formed in the RAM 4, is counted incremented regardless of whether the CPU 2 is started normally or erroneously (Step S2). The CPU 2 further outputs the inhibit release signal (second control signal) to the flip flop 14b of the inhibit circuit 14 so as to reset the flip flop 14b and turn the transistor 14a off, thereby stopping the inhibit function. However, it is a matter of course that when the inhibit function has been already stopped, no change occurs even if the inhibit release signal is output.

A decision is then made as to whether the value of the start number register 4a is the set value or more (Step S3). If the value has not reached the set value, the flow moves to Step S4, the IC card waits for the identification data supplied from the external device. In this state, when an identification code or the like is supplied from the external device, a decision is made as to whether the received signal such a the identification code or the like is regular. When no identification code is received within a predetermined time, it is a time-out (Step S4). If it is decided that the received signal is regular, data is transmitted and received (Step S7). If it is decided that the identification code is wrong, or if it is time out, the oscillation circuit in the CPU 2 is immediately stopped so that the IC card is in the stand-by state (Step S8).

On the other hand, if it is decided in Step S3 that the value of the start number register 4a is the set value or more, the flow moves to Step S5 in which the CPU 2 outputs the inhibit signal (control signal) to the flip flop 14b of the inhibit circuit 14 so as to turn the transistor 14a on and inhibit the voltage received by the antenna 10 (Step S5). Code A indicating that the number of starts has reached the set value or more is then sent to the external device (Step S6). The oscillation circuit of the CPU 2 is then stopped in Step S8, and a series of operation steps are completed.

When the external device receives the code A, the display 121 shown in FIG. 6 displays or the alarm generating section 123 generates alarm sound to notify the user of the end of the life of the IC card.

Figure 10:
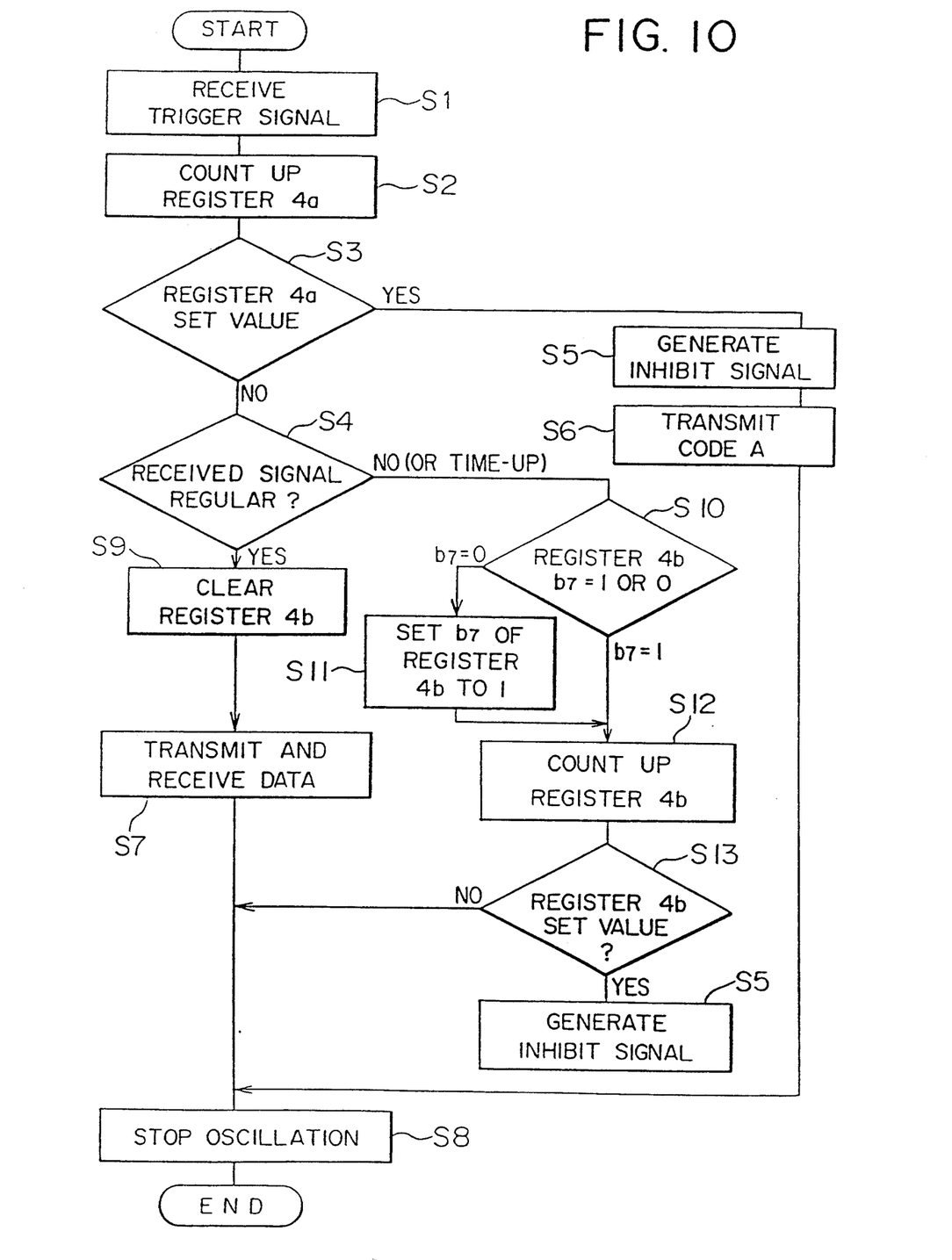
FIG. 10 is a flow chart showing the operation of an IC card in accordance with a third embodiment of the invention.

FIG. 10 is a flow chart showing the operation sequence of an IC card in accordance with a third embodiment of the present invention. Although this embodiment uses the external device 100 shown in FIG. 6 and the IC card 1 shown in FIG. 7, the program stored in the IC card 1 is different from that in the second embodiment. In addition, the IC card of this embodiment employs both the start number register 4a and the erroneous start number register 4b. The operation of the third embodiment is described below with reference to FIGS. 2, 6 to 8 and 10.

In FIG. 10, since Step 1 to Step 3 in which a decision is made on the start number register 4a are the same as those in the second embodiment, and since the operations in the Steps (S5–S6–S8) when it is decided in Step S3 that the value of the register 4a has reached the set value are also the same as those in the second embodiment, these steps are not described below. If it is decided in Step S3 that the value of the register 4a is less than the set value, the flow moves to Step S4 in which the IC card waits for identification data supplied from the external device. In this state, when an identification code is supplied from the external device, a decision is made as to whether the received signal of the identification code is regular, and when no identification code is received within the predetermined time, it is decided as a time-out (Step S4). If it is decided that the received signal is regular, the erroneous start number register 4b is cleared (reset) (Step S9), and data is transmitted and received (Step S7). When data is completely transmitted and received, the oscillation of the oscillation circuit of the CPU 2 is stopped so that the IC card is again in the stand-by state (waits for the trigger) (Step S8).

If it is decided in Step S4 that the identification code is wrong or that it is time-out, a decision is made as to whether the value $b_7$ of bit 7 of the erroneous start number register 4b, which is shown in FIG. 2, is "1" or "0" (Step S10). If the value $b_7$ is "0", it is set to "1" for indicating that an erroneous start occurs (Step S11), and the count value of the erroneous start number register 4b is then counted up (Step S12). If it is decided in Step S10 that the bit value $b_7$ of the erroneous start number register 4b is "1", since erroneous starts occur at the preceding time and this time, i.e., continuous erroneous starts occur, the value of the erroneous start number register 4b is immediately incremented (Step S12).

A decision is then made in Step S13 as to whether the value of the continuous erroneous start number register 4b reaches the set value. If the value is less than the set value, the oscillation is stopped so that the IC card is in the stand-by state in Step S8. If it is decided in Step S13 that the value reaches the set value, the inhibit signal is supplied to the inhibit circuit 14 (refer to FIG. 8) so as to make the inhibit function work (Step S5), and the oscillation of the oscillation circuit in the CPU 2 is then stopped so that the IC card is in the stand-by state (Step S8).

Figure 11:
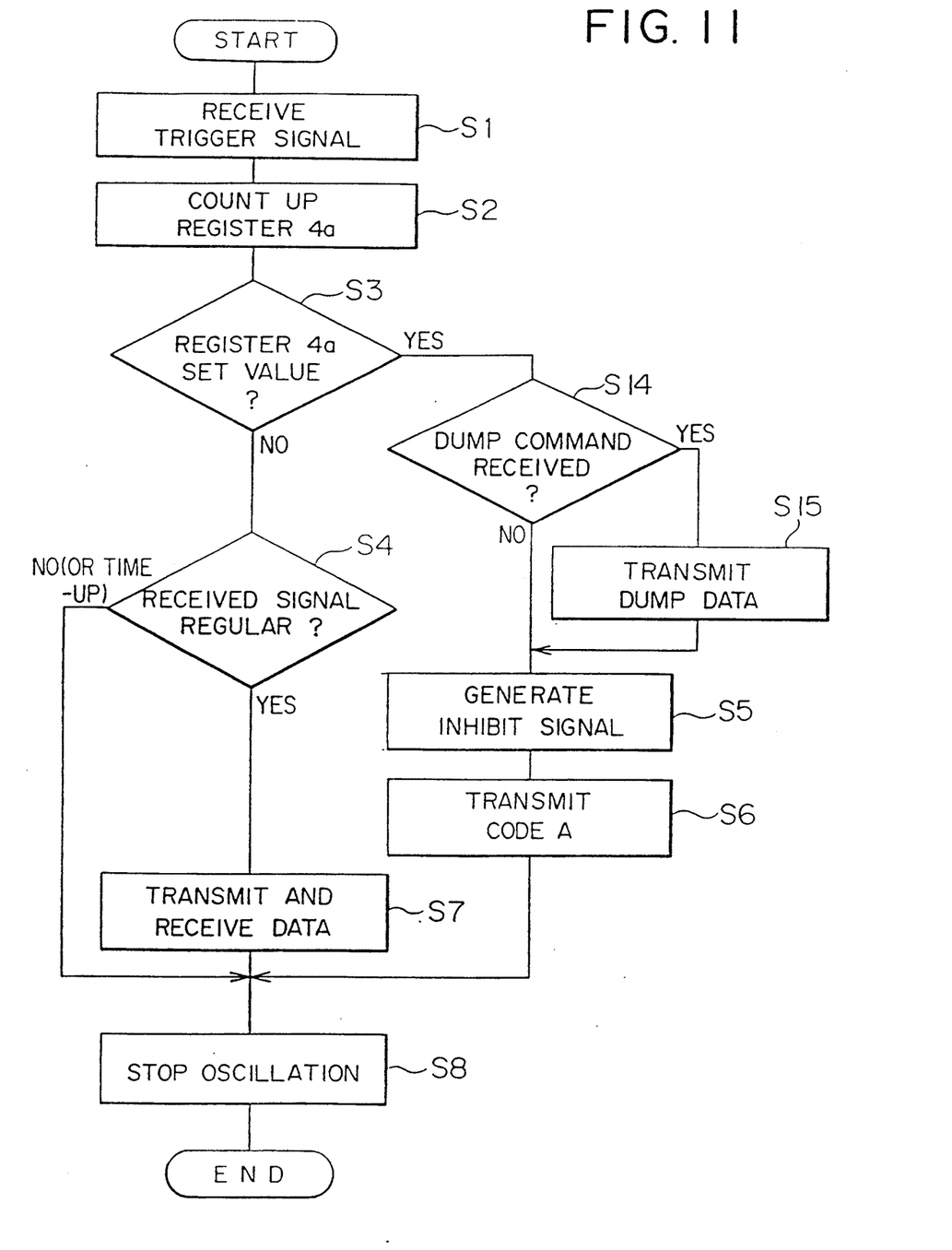
FIG. 11 is a flow chart showing the operation of an IC card in accordance with a fourth embodiment of the invention.

FIG. 11 is a flow chart showing the operation sequence of an IC card in accordance with a fourth embodiment of the present invention. Although this embodiment uses the external device 100 shown in FIG. 6 and the IC card 1 shown in FIG. 7, the program stored in the IC card 1 is different from that in the above embodiment. The IC card 1 of this embodiment employs only the start number register 4a. The operation of the fourth embodiment is described below with reference to FIGS. 2, 6 to 8 and 11.

In the flow chart of the fourth embodiment, Steps S14 and S15 are added to the flow chart of the second embodiment shown in FIG. 9. If it is decided in Step S3 that the value of the start number register 4a reaches the set value, the flow moves to Step S14 in which the IC card waits for a dump command from the external device. If no dump command is received within a predetermined time, the flow moves to Step S5, and the processing in the same steps (Steps S5–S6–S8) as those in the second embodiment is performed. On the other hand, when the dump command is received from the external device within the predetermined time in Step S14, the data stored in the memory (RAM 4) is dumped or transmitted. The flow then moves to Step S5. In this embodiment, the IC card has as means for protecting the IC card from trouble by reading the data stored therein when periodically receiving the dump command from the external device.

Although the four embodiments are described above, the functions of the respective embodiments can be combined as occasion demands. The present invention is not limited to the four embodiments, but the invention is limited by the Claims. present invention, since the total number of starts of the card (CPU) and the number of continuous erroneous starts are counted and stored so that the lower threshold value of the received signal level, which allows the card to receive a signal, is increased when one of the two star numbers reaches the set value, the card is no longer falsely started by external noise or the like. In addition, since the bias current flowing through the receiving circuit is made unnecessary at the same time as the increase in the threshold value, the data stored in the IC card is not lost due to consumption of the battery. Further, if the threshold value is significantly increased, the IC card cannot be started by a usual external device. In this case, the card can be returned to the original state). by supplying the trigger signal to the card from a dedicated external device which has a high transmit signal level and which is brought close to the card. It is also possible to add the alarm function and dump function to the card and produce an IC card having high reliability.

What is claimed is:

1. An IC card containing a battery, transmitting data and signals to and receiving data and signals from an external device using electromagnetic waves, and having a stand-by state and an operating state, a trigger signal received from an external device activating said IC card from the stand-by state to the operation state, said IC card comprising:

non-volatile storage means for storing a program;
   volatile storage means for storing data;
   data processing means for controlling a signal and for processing data in said pro card according to the program, said data processing means being activated from the stand-by state by the trigger signal received by said card, start number counting/storing means for counting and storing at least the number of times said data processing means is started as a count value, said data processing means generating a control signal when the count value reaches a set value;
   a bus connecting said data processing means, said non-volatile storage means, said volatile storage means, and said start number counting/storing means to each other;
   an antenna for transmitting and receiving electromagnetic waves;
   input/output controlling means connected between said antenna and said bus for increasing a lower threshold receivable signal level in response to the control signal generated by said data processing means indicating that the count value of said start number counting/storing means has reached the set value; and
   a battery connected to and supplying power to each of said non-volatile storage means, said volatile storage means, said data processing means, said start number counting/storing means, and said input/output controlling means.

2. An IC card according to claim 1 wherein said input/output controlling means comprises a transmitting circuit, a first receiving circuit requiring a bias current and having a first threshold receivable signal level, a second receiving circuit having a second threshold higher than the first threshold, and a switch for connecting said second receiving circuit between said antenna and said bus in place of said first receiving circuit in response to the control signal when the count value reaches the set value, said bias current flowing through said first receiving circuit being stopped when said second receiving circuit is connected in place of said first receiving circuit, said start number counting/storing means comprising a start number register within said volatile storage means for counting the total number of starts, said start number register being incremented by said data processing means each time said data processing means is started from the stand-by state.

3. An IC according to claim 2 wherein said input/output controlling means comprises a modulator/demodulator connected to said transmitting circuit and said switch and an input/output circuit for converting serial signals to parallel signals and parallel signals to serial signals connected between said modulator/demodulator and said bus.

4. An IC card according to claim 1 wherein said input/output controlling means comprises a transmitting circuit, a receiving circuit requiring a bias current, and an inhibit circuit connected between said receiving circuit and said antenna for grounding said antenna through a predetermined resistance in response to the control signal supplied from said data processing means when the count value reaches the set value wherein said start number counting/storing means comprises a start number register formed within said volatile storage means for counting the total number of starts, said register being incremented each time said data processing means is started from the stand-by state.

5. An IC according to claim 4 wherein said input/output controlling means comprises a modulator/demodulator connected to said transmitting circuit and said switch and an input/output circuit for converting serial signals to parallel signals and parallel signals to serial signals connected between said modulator/demodulator and said bus.

6. An IC according to claim 1 wherein when the count value reaches the set value, said data processing means supplies the control signal to said input/output controlling means and simultaneously generates a code for informing an external device that the count value has reached the set value.

7. An IC card according to claim 1 wherein said start number counting/storing means counts and stores the total number of starts of said data processing means and the number of continuous erroneous starts of said data processing means, said data processing means generating said control signal when either of the total number of starts and the number of continuous erroneous reaches respective set values.

8. An IC card according to claim 7 wherein when one of the total number of starts and the number of continuous erroneous starts reaches respective set values said data processing means supplies said control signal to said input/output controlling means and, when said total number of starts reaches the set value, said data processing means generates a code for informing an external device that said total number has reached said set value.

9. An IC card according to claim 8, wherein said start number counting/storing means comprises a start number register for counting and storing said total number of starts and an erroneous start register for counting and storing said number of continuous erroneous starts, both of which are formed in said volatile storage means and which are incremented and cleared by said data processing means.

10. An IC card according to claim 9 wherein an external device sequentially generates a trigger signal and an identification code; said start number register counts the total number of starts of said processing means from the stand-by state, and said erroneous start number register counts the number of continuous erroneous starts of said data processing means and includes a single bit indicating that an erroneous start occurred at a preceding time; and said data processing means increments said start number register by one each time said data processing means is started from the stand-by state by a trigger signal received through said antenna, and when the identification code sent from the external device is irregular or when no identification code is received within a predetermined time and an erroneous start occurred at a preceding time, said data processing means increments said erroneous start register, and when said identification code is regular, said data processing mean clears said erroneous start register.

11. An IC card according to claim 1 wherein said data processing means generates a second control signal for returning the threshold of a receivable signal level of said input/output controlling means to a lower value each time said data processing means is started by said trigger signal.

12. An IC card system in which data and signals are transmitted and received using electromagnetic waves, including:
- an IC card comprising data processing means activated to an operating state from a stand-by state by a trigger signal received from an external device;
- an external device having means for sequentially generating a trigger signal for activating said IC card to an operating state from a stand-by state and an identification code, periodically generating a dump command and for indicating that the total number of starts of said IC card has reached a set value according to a code sent from IC card; and
- an IC card comprising non-volatile storage means for storing a program;
- volatile storage means for storing data;
- data processing means for controlling a signal and for processing data in said card according to the program, said data processing means being activated from the stand-by state by the trigger signal received by said card;
- start number counting/storing means for counting and storing at least the number of times said data processing means is activated as a count value, said data processing means generating a control signal when the count value reaches a set value, and when said total number of starts reaches a set value, reading all data stored in said volatile storage means according to the dump command generated by said external device and then generating a code indicating that the number of starts has reached a set value to said external device;
- a bus connecting said data processing means, said non-volatile storage means, said volatile storage means, and said start number counting/storing means to each other;
- an antenna for transmitting and receiving electromagnetic waves;
- input/output controlling means connected between said antenna and said bus for increasing a lower threshold receivable signal level in response to the control signal generated by said data processing means indicating that the count value of said start number counting/storing means has reached the set value; and
- a battery connected to and supplying power to each of said non-volatile storage means, said volatile storage means, said data processing means, said start number counting/storing means, and said input/output controlling means.

* * * * *